Oct. 8, 1929. J. H. BRUNINGA 1,730,447
RECTIFIER FOR ALTERNATING CURRENTS
Filed March 30, 1922
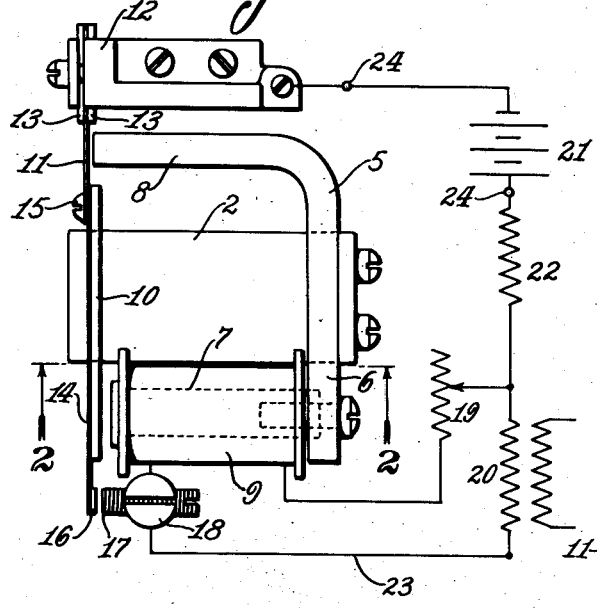
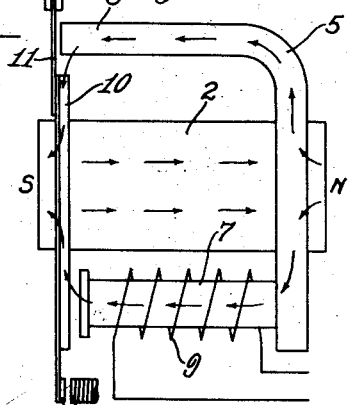
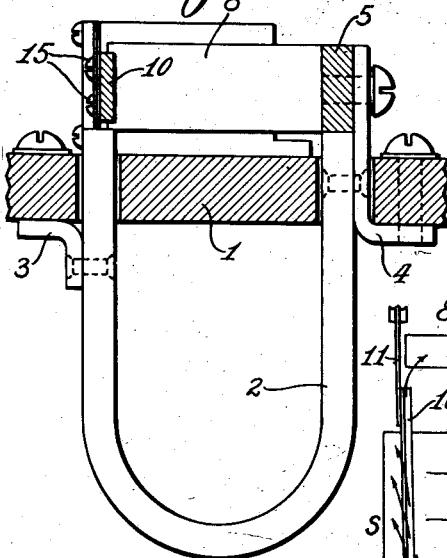
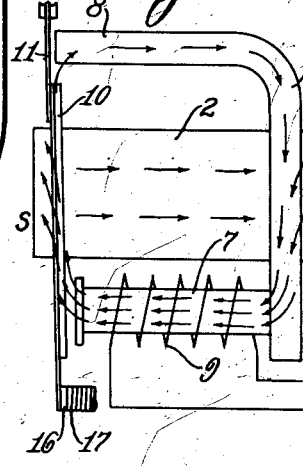
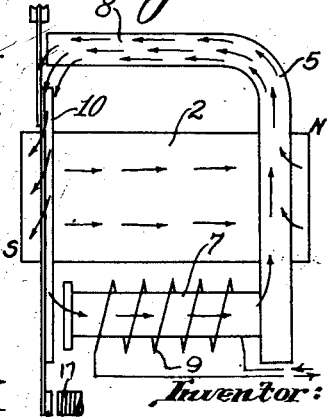
Inventor:
John H. Bruninga Patented Oct. 8, 1929

1,730,447

UNITED STATES PATENT OFFICE

JOHN H. BRUNINGA, OF ST. LOUIS, MISSOURI

RECTIFIER FOR ALTERNATING CURRENTS

Application filed March 30, 1922. Serial No. 548,112.

This invention relates to rectifiers for alternating currents, and more particularly to rectifiers of the vibrating type.

Rectifiers have frequently been constructed on the principle of opening and closing a charging circuit in synchronism with the alternations of the supply current, and in such a way that the circuit will always be closed when the current impulse is in the same direction, so that the flow of current in the charging circuit will always be in the same direction. An important feature of any succussful vibrating rectifier is that the closing of the charging circuit shall take place not only with current impulses always in the same direction, but that direction of impulse must be selected which will insure the proper polarity at the rectifier terminals to which the charging circuit is connected. By charging circuit, as used herein, is mean the circuit in which the rectified current is to be utilized.

In order to insure such proper selection of polarity, it is customary to employ a permanent magnet in connection with a switching armature, so that the current direction which will cause closing of the armature circuit will be determined. Whenever a permanent magnet is used, however, with devices employing alternating currents, great care must be exercised to provide that none of the flux set up by the alternating currents will traverse the permanent magnet. The effect of such a flux will be eventually to demagnetize the permanent magnet, and render the device inoperative so far as the proper determination of polarity is concerned.

One of the objects of this invention is to provide an alternating current rectifier, in which the magnetic circuits are so arranged as to avoid demagnetization of the permanent magnet.

Another object of this invention is to provide such a rectifier in which an independent magnetic circuit shall be provided for the flux set up by the alternating current.

Another object of this invention is to provide such a rectifier with an independent magnetic circuit of which the vibrating armature shall form a part.

Further objects will appear from the detail description taken in connection with the accompanying drawing, in which:

Figure 1 is a plan view, showing a rectifier embodying this invention with the auxiliary circuits shown in diagrammatic form;

Figure 2 is a section on line 2—2, Figure 1;

Figure 3 is an outline view, illustrating the flow of magnetism through the magnetic circuits when no current is flowing in the alternating current circuit;

Figure 4 is a view similar to Figure 3, showing the conditions when current is flowing in the alternating current circuit; and Figure 5 is a view similar to Figure 4, but with the current reversed.

Referring to the accompanying drawing, 1 designates the base or support upon which the rectifier mechanism is mounted. This is usually constructed as a plate of slate or similar material, arranged as a cover for a box or casing in which the auxiliary apparatus, such as resistance and transformer coils, are mounted. These latter auxiliaries are not shown in detail since they are not essential features of the present invention. 2 designates a permanent horse-shoe magnet mounted by means of brackets 3 and 4 on the base 1. The bracket 3 is preferably of non-magnetic material, while the bracket 4 is of magnetic material, preferably soft iron, and is riveted or otherwise fixed to one pole of the magnet 2. The bracket 4 may serve for the attachment of a core 5 to the permanent magnet 2. The core 5 is angular in form, having one leg 6 fixed to the magnet 2 as just described and extending therebeyond to receive the solenoid core 7. The other leg 8 of the core 5 extends at right angles to the leg 6 to a point close to the pivot end of the vibrating armature. The core 7 may be attached to the leg 6, so as to extend in a direction substantially parallel to the leg 8 and may be provided with an energizing coil or solenoid 9. The leg 8 and the core 7 are thus adapted to form poles at the extremities of a core of circuital form, adjacent which a vibrating armature 10 is mounted bridging the gap between the poles and completing the circuit. By a core of "circuital" form, as used hereinafter, is meant a core having generally a horse-shoe form and adapted to form part of a complete magnetic circuit.

The vibrating armature 10 is constructed of magnetic material, preferably soft iron, and is mounted by means of a flat spring 11 (preferably of non-magnetic material, such as bronze) upon a suitable support 12. The spring 11 is held by clamping plates 13, whose position may be adjusted in the support so that the effective length of the spring 11 may be adjusted so as to adjust the natural period of vibration of the armature 10. The armature 10 is further provided with a flat spring 14 attached to the armature at one end thereof by means of screws 15 or other suitable fasteners. The other end of the spring 14 is free and carries a circuit making and breaking contact 16, adapted to engage a similar contact 17 mounted for screw adjustment in the binding post 18. The screw adjustment is provided so that the gap between the contacts 16 and 17 may be properly adjusted. This mounting of the spring 14 provides a yielding stop for the armature when the contacts 16 and 17 come into engagement. This yielding stop provides for a uniform and easy swing during vibration. The mounting of the armature 10 is arranged so that said armature will span the space between the poles formed by the leg 8 and the end of the core 7. The end of the leg 8 may be arranged to extend to a point beyond the pivot end of the armature 10. The end of the core 7 is positioned opposite the vibrating end of the armature 10 but spaced therefrom a sufficient distance to allow for vibration. The cores 7 and 5 and the armature 10 thus form a nearly closed magnetic circuit in which the alternating flux may be set up by currents in the coil 9, and this flux will traverse the armature 10.

One pole of the permanent magnet 2 having attached thereto the core 5, the other pole of said magnet is positioned underneath and somewhat outside of the armature 10, as clearly illustrated in Figure 2. By this construction, the core 5, 7, which may be considered as a single core, since it is divided only for mechanical reasons, forms a divided path for the permanent magnetic flux of the magnet 2, as illustrated in Figure 3. In this figure, assuming the polarity shown, the flux of the permanent magnet traverses the yoke thereof from left to right. This flux will emerge from the pole N and divide in the core 5, a part thereof traversing the leg 8, and another part traversing the core 7. These two branches of the flux enter the armature 10 at opposite ends thereof and traveling toward the middle, emerge therefrom and enter the pole S of the permanent magnet 2. This is with no current flowing in the coil 9. Under these conditions the permanent flux will exert a retrograde pull on the armature 10 so as to move it to open-circuit position.

Assuming now that current flows in the coil 9 in the direction indicated in Figure 4, a flux will be set up in the core 7 in the direction indicated by the arrows in Figure 4. This flux will traverse the magnetic circuit comprising the core 7, the armature 10 and the core 5 as indicated by the arrows in this figure. That part of the flux of the permanent magnet 2 which originally traversed the core 7 will still take that path. That part of the permanent magnet flux which originally traversed the leg 8, however, is now opposed by the flux set up in that leg by the current in the coil 9. This latter part of the permanent magnet flux will, therefore, take the path of lowest reluctance, namely through the core 7. Thus, all of the permanent magnet flux will upon emerging from the pole N traverse the core 5, 7 and part of the armature 10 and enter the pole S. None of this permanent magnet flux will traverse the leg 8 under these conditions. The effect of this condition is to concentrate both the permanent flux and that set up by the coil 9 in the core 7 and the adjacent free end of the armature 10, so that said armature will be strongly attracted to said core and will consequently move so as to close the contacts 16 and 17.

Assuming now that current traverses the coil 9 in the direction indicated in Figure 5, which is opposite to that of Figure 4, the flux set up by this current in the core 7 will now be opposed to that part of the permanent magnet flux which originally traversed said core and will traverse the magnet circuit 7, 5, 8 and 10 in the opposite direction to that set up by the current of Figure 4. That part of the permanent flux which originally traversed the core 7 will now be forced to traverse the leg 8, so that both the permanent magnet flux and that set up by the coil 9 will traverse the leg 8. The effect of current in this direction will be, therefore, to concentrate the flux in the leg 8 and the adjacent pivot end of the armature 10, while comparatively little flux will traverse the core 7 and the end of the free armature 10 adjacent thereto. The result of this action will be that the attraction between the core 7 and the armature 10 will be much reduced so that it will be unable to move said armature against the tension of the spring 11, assisted by the retrograde pull of the pole S, and with the current in this direction, the contacts 16 and 17 will remain open. As a matter of fact, the flux in the core 7 may be reduced sufficiently below the normal permanent flux when no current flows, that the spring 11 will actually draw back the armature to further separate the contacts 16 and 17. It will be noted that the alternating flux traverses the armature 10 longitudinally thereof. It will also be noted that the hinge end of the armature faces one pole of the core 5 at the end 8, so that the flux passing between the core and the armature will enter or leave substantially at the end face of the armature. It is obvious, therefore, that the attractive force exerted upon the armature at this point acts longitudinally of the armature, or at least has a substantial longitudinal component. It will be clear, therefore, that such attractive force may be quite strong without having an appreciable tendancy to move the armature. At the free end of the armature, on the other hand, the flux enters or leaves the armature at a side face thereof. At this end, therefore, the attractive force will act transversely of the armature and will be correspondingly more effective in moving the same. It will be seen, therefore, that this construction wherein the core of circuital form, has its poles bridged by the armature so that the alternating flux may circulate through the circuit formed by said core and said armature and in which the armature is mounted for movement at one end thereof only, is effective in causing the armature to vibrate definitely in synchronism with the alternating flux.

This rectifier may be connected to the supply circuit, as indicated in Figure 1. The coil 9 is connected through an adjustable resistance 19 to the secondary of a step-down transformer 20, the primary of which will be connected to the supply line. The charging circuit may include a battery 21 or other utilizing device which is connected through a resistance 22 to one side of the secondary of the transformer 20 and via the support 12, the armature 10, the contacts 16 and 17, the binding post 18 and the conductor 23 to the other side of said secondary. The resistance 19 serves to adjust the current in the coil 9 to the proper value so that the armature 10 may be positively attracted with the current in one direction and released when the current reverses. The resistance 22 serves to limit the current flow through the utilizing device 21 in case the secondary voltage of the transformer 20 is too high. In ordinary practice, all of these devices, except the utilizing device 21, are usually assembled with the rectifier being mounted in the casing underneath the base 1, on which suitable terminals 24 may be provided for connecting the device 21.

In the operation of this device the primary of the transformer 20 is connected to the alternating current source of supply. The secondary of this transformer will then supply an alternating current to the coil 9 through the resistance 19. As this current flows in one direction, the armature 10 will be attracted to the core 7, as has previously been explained, in connection with Figure 4. Upon such movement the contacts 16 and 17 will be closed. Upon closing the contacts, current will flow from the transformer 20, via the conductor 23, the contacts 17, 16, the spring 14, the spring 11, the support 12, and the terminal 24 to the battery or utilizing device 21. The return current will flow from the battery 21 into the terminal 24 and by way of the resistance 22 back to the transformer 20. Upon reversal of the current, the magnetic condition illustrated in Figure 5 will be set up. The attraction of the armature 10 will be released and said armature will, under the restraining influence of the spring 11, swing back so as to open the contacts 16 and 17. The opening of these contacts will prevent the reverse current from flowing through the battery 21. It is evident, of course, that the flow of the reverse current through the battery is to be prevented. Such a flow will be liable to injure or otherwise adversely affect the operation of the device 21. As the reversal of current takes place very rapidly, in most cases at the rate of one hundred and twenty reversals per second, the armature 10 will vibrate in synchronism with such reversal. In order that this synchronous vibration will be maintained and the operation of the device will be maintained uniform, the natural period of vibration of the armature 10 and its connected parts should be adjusted to a period substantially equal to the interval between reversals of the current. This may be done, first by properly adjusting the weight of the armature 10 and the strength of the spring 11, and secondly by adjusting the position of the clamping plates 13, so as to adjust the length of the spring 11. With proper adjustment of the period of vibration of the armature 10 and of the current in the coil 9 by means of the resistance 19, the opening and closing of the contacts 16 and 17 can be made to take place practically at the moment of reversal of the current, so that little or no arcing will take place at said contacts.

It will, therefore, be seen that this invention accomplishes its objects. A separate circuit is provided in which the flux set up by the alternating current may circulate, and this circuit is combined with the permanent magnet in such a way that the direction of flux in said permanent magnet is never reversed, while at the same time, said magnet functions to give the rectifier its proper polarity. It will be seen, therefore, that there will be no tendency to demagnetize the permanent magnet. The switching armature is arranged to form a part of the magnetic circuit in which the flux set up by the alternating current circulates.

The permanent magnet serves simply to determine that direction of flux in the alternating magnetic circuit which will cause the armature 10 to be attracted to close the contacts 16 and 17.

It will be noted that the leg 8 and the core 7 may be said to form poles for the magnetic circuit in which the alternating flux is set up. The armature 10 is mounted to bridge the gap between these poles. The arrangement of these poles and the mounting of the armature 10 so as to be fixed at one end thereof to vibrate at the other insures that the contacts 16 and 17 will be closed always with the same current direction through the coil 9. Reference to Figures 4 and 5 will make this clear. With the condition of Figure 4, the flux is concentrated at the vibrating end of the armature and is in such a direction that the armature will be strongly attracted to the core 7. With the condition of Figure 5, the flux is concentrated at the pivot end of the armature and is in such a direction that whatever attractive force is exerted thereby will be directed along the armature and practically in line with the pivot so that but little deflecting effect will be produced on the armature. With this condition also, the flux and, therefore the attractive force at the vibrating end of the armature will be greatly diminished, so that the contacts will remain open.

It is obvious that various changes may be made in details of construction without departing from the spirit of this invention; it is, therefore, to be understood that this invention is not to be limited to the specific details shown and described.

Having thus described the invention, what is claimed is:

1. A rectifier for alternating currents, including a permanent magnet, a core connected with said magnet and constructed to provide a divided path for the permanent flux and having spaced poles, a switching armature pivoted at one end thereof adjacent one of said poles and bridging the gap between said poles lengthwise of said armature so as to form with said core a nearly closed magnetic circuit, of which said armature forms a substantial part, and a winding adapted to set up an alternating flux traversing said circuit, said core and armature forming the principal circuit for the alternating flux.

2. A rectifier for alternating currents, including, a permanent magnet, a core connected with said magnet and constructed to provide a divided path for the permanent flux and having spaced poles, a switching armature pivoted at one end thereof adjacent one of said poles and bridging the gap between said poles lengthwise of said armature so as to form with said core a nearly closed magnetic circuit, and a winding on said core adapted to set up an alternating flux traversing said circuit in order to produce a concentrated flux alternately at opposite ends of said armature.

3. A rectifier for alternating currents, including a permanent magnet, a core of circuital form adapted to provide a divided path for the permanent flux of said magnet and having poles, a vibrating armature suspended for vibration at one end thereof and bridging the gap between said poles, and means for setting up an alternating flux traversing a magnetic circuit defined by said core and said armature, constructed and arranged so that the attractive force exerted on said armature at one of said poles has a substantial component acting longitudinally of said armature.

4. A rectifier for alternating currents, including a permanent magnet, a core of circuital form adapted to provide a divided path for the permanent flux of said magnet and having poles a vibrating armature suspended for vibration at one end thereof to bridge the gap between said poles and having an end facing said core so that the flux traverses said armature longitudinally at said end, and means for setting up an alternating flux in a path defined by said core and said armature.

5. A rectifier for alternating currents, including a permanent magnet, a core of circuital form adapted to provide a divided path for the permanent flux of said magnet and having poles, a vibrating armature suspended for vibration at one end thereof to bridge the gap between said poles and having its hinge end facing said core so that the flux traverses said armature longitudinally at said end, and means for setting up an alternating flux in a path defined by said core and said armature.

6. A rectifier for alternating currents, including a permanent magnet, a core of circuital form adapted to provide a divided path for the permanent flux of said magnet and having poles a vibrating armature suspended for vibration at one end thereof so as to bridge the gap between said poles and displaced relatively to the axis of said permanent magnet, and means for setting up an alternating flux in a magnetic circuit defined by said core and said armature, constructed and arranged so that the flux passing between said permanent magnet and said armature exerts a retrograde pull on said armature.

7. A rectifier for alternating currents, including a permanent magnet, a core of circuital form adapted to provide a divided path for the permanent flux of said magnet and having poles, a vibrating armature suspended for vibration at one end thereof and to bridge the gap between said poles and carrying a circuit-closing contact, and means for setting up an alternating flux in a magnetic circuit defined by said core and said armature, said magnet being adapted by its permanent flux to exert a pull on said armature tending to move said contact to open circuit position.

8. A rectifier for alternating currents including a permanent magnet, a core of circuital form adapted to provide a divided path for the permanent flux of said magnet and having poles, a vibrating armature suspended for vibration at one end thereof and to bridge the gap between said poles and carrying a circuit-closing contact, and means for setting up an alternating flux in a magnetic circuit defined by said core and said armature, said magnet being positioned relatively to said armature so as to exert by its permanent flux a pull on said armature tending to move said contact to open circuit position.

In testimony whereof I affix my signature this 28th day of March, 1922.

JOHN H. BRUNINGA.